(12) United States Patent
Ålleving et al.

(10) Patent No.: US 6,543,217 B2
(45) Date of Patent: Apr. 8, 2003

(54) SYSTEM FOR DETERMINING THE EFFECTIVENESS OF A CATALYTIC COATING ON A CATALYTIC CONVERTER IN A MOTOR VEHICLE

(75) Inventors: Peter Ålleving, Alingåsas (SE); Anders Unger, Rävlanda (SE); Jan Sköld, Alingsås (SE); Martin Petersson, Västra Froölunda (SE); Erland Max, Västra Frölunda (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 09/681,624

(22) Filed: May 10, 2001

(65) Prior Publication Data

US 2002/0000088 A1 Jan. 3, 2002

(30) Foreign Application Priority Data

May 10, 2000 (SE) .............................. 0001765

(51) Int. Cl.⁷ ................................ F01N 3/00
(52) U.S. Cl. ............................ 60/277; 60/276; 60/298; 60/307; 123/536; 423/213.2; 423/213.5; 422/107; 422/109; 422/108; 422/115
(58) Field of Search ............... 60/277, 298, 299, 60/286, 300, 307, 276, 320; 123/41.44, 41.01, 198 E, 536; 423/213.2, 213.5; 422/107–109, 114–115, 168, 173

(56) References Cited

U.S. PATENT DOCUMENTS

| | | | |
|---|---|---|---|
| 2,779,513 A | | 1/1957 | Dickey |
| 3,716,306 A | | 2/1973 | Martin, Sr. et al. |
| 3,738,088 A | * | 6/1973 | Colosimo ..................... 55/104 |
| 4,065,235 A | | 12/1977 | Furlong et al. |
| 4,111,614 A | | 9/1978 | Martin et al. |
| 4,733,605 A | * | 3/1988 | Holter et al. ................. 98/2.11 |
| 4,846,641 A | | 7/1989 | Pieters et al. |
| 5,335,719 A | * | 8/1994 | Khelifa et al. ................. 165/42 |
| 5,702,234 A | | 12/1997 | Pieters |
| 5,779,456 A | | 7/1998 | Bowes et al. |
| 5,997,831 A | * | 12/1999 | Dettling et al. ............. 423/219 |
| 6,190,627 B1 | * | 2/2001 | Hoke et al. .................. 423/219 |
| 6,200,542 B1 | * | 3/2001 | Poles et al. .................. 423/210 |
| 6,212,882 B1 | * | 4/2001 | Greger et al. .................. 60/274 |
| 6,319,484 B1 | * | 11/2001 | Shore et al. ............. 423/245.1 |

* cited by examiner

*Primary Examiner*—Thomas Denion
*Assistant Examiner*—Binh Tran
(74) *Attorney, Agent, or Firm*—Howrey Simon Arnold & White LLP

(57) ABSTRACT

A system for determining the effectiveness of a catalytic coating on a catalytic converter in a motor vehicle. The system provides a driver or maintenance staff status of the catalytic function provided by the catalytic coating on the catalytic converter which is downstream from a heat exchanger connected to a cooling system in an engine in a motor vehicle. The catalytic converter is arranged to be heated by an air flow passing through the catalytic converter. The catalytic coating on the catalytic converter converts environmentally harmful substances in ambient air into substances which are not harmful to the environment. The motor vehicle also includes a control unit and a sensor. The sensor is connected to the control unit and is able to determine a degree of conversion of one or more environmentally harmful substances by the catalytic coating on the catalytic converter.

55 Claims, 2 Drawing Sheets

SYSTEM FOR DETERMINING THE EFFECTIVENESS OF A CATALYTIC COATING ON A CATALYTIC CONVERTER IN A MOTOR VEHICLE

CROSS REFERENCE TO RELATED APPLICATIONS

The present application claims priority to Swedish Application No. 0001765-7, filed May 10, 2000.

BACKGROUND OF INVENTION

TECHNICAL FIELD

This invention relates to a catalytic coating for use with a catalytic converter in a motor vehicle, and more particularly, to a determining the effectiveness of a catalytic coating on a catalytic converter in a motor vehicle.

Radiator assemblies for motor vehicles, where the radiator assembly is coated with catalytic material for conversion of environmentally harmful substances in ambient air during the utilization of the motor vehicle, are well known. The purpose of this catalytic coating is to utilize the vehicle for improving the environment by cleaning ambient air. Similarly, a catalytic coating can be applied to a catalytic converter in the exhaust system for a motor vehicle.

In order for the catalytic coating to convert an environmentally harmful substance, the coating needs to achieve its working temperature. As a result of the exhaust system being heated by the exhaust, a working temperature for the catalytic coating is provided without requiring additional work from the engine since the exhaust system is designed to pass the exhaust fumes from the engine to the environment. Furthermore, the catalytic converter is positioned to provide an extensive heat exchange with the environment. This is accomplished by placing the radiator in a position enabling a good through-flow of air. Since a large quantity of the exhaust passes through the catalytic converter, the catalytic coating is able to clean large quantities of air.

However, as a result of the positioning of the catalytic converter, it has been found that the catalytic function may degrade without the knowledge of the driver of the vehicle. Moreover, the driver will not realize effectiveness of the catalytic coating has degraded from the behavior of the vehicle, since the catalytic function does not affect the performance of the vehicle.

SUMMARY OF INVENTION

One aspect of the invention is to provide a vehicle where a driver or maintenance staff can be informed about the status of the catalytic function which is provided by means of a catalytic coating on a catalytic converter mounted downstream from a heat exchanger included in a cooling system connected to an engine. The catalytic converter is heated by the exhaust passing from the engine to the environment.

DETAILED DESCRIPTION

Figure 1:
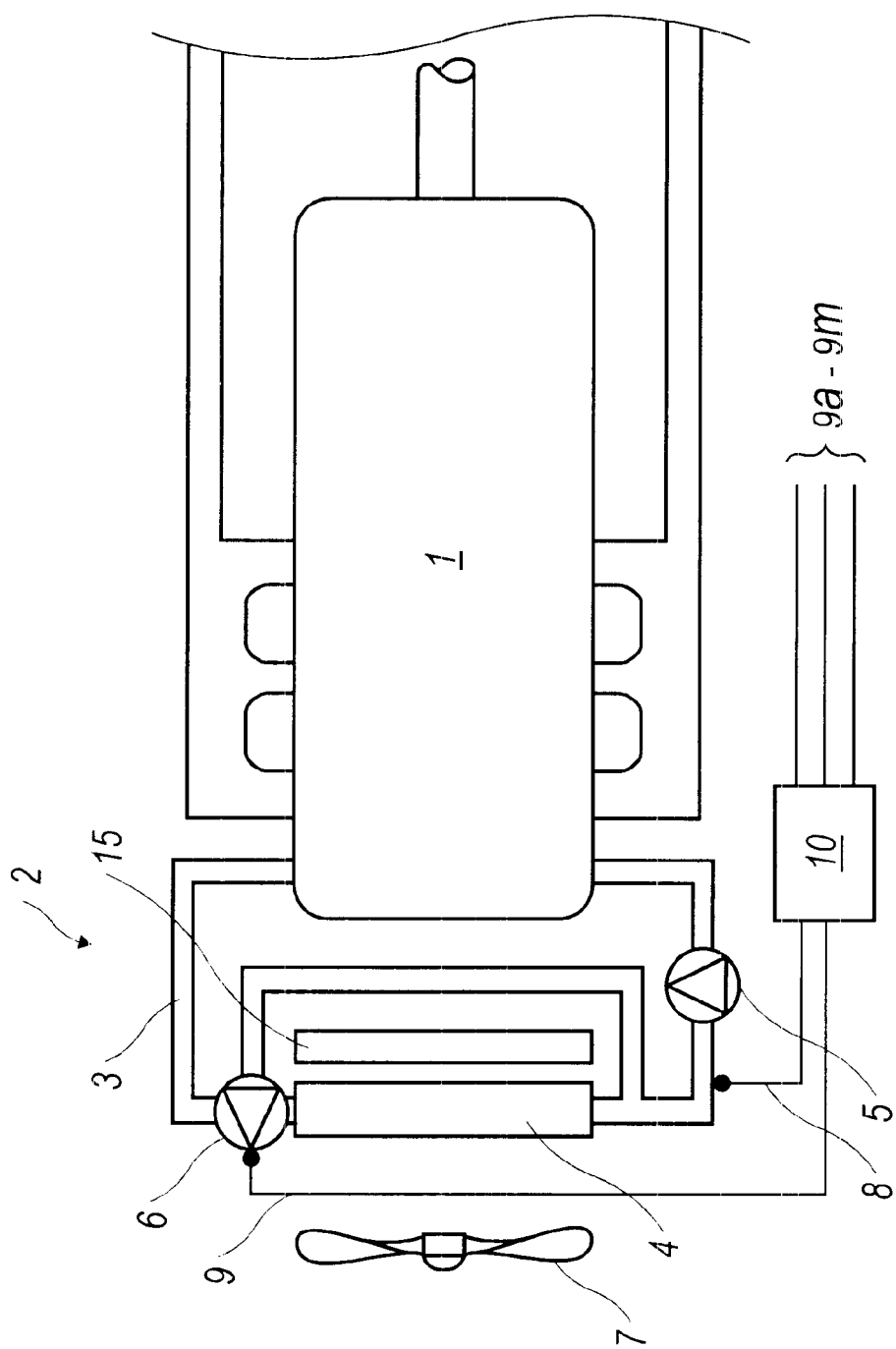
FIG. 1 is a schematic illustration of a combustion engine according to a first embodiment of the invention.

Referring to FIG. 1, a schematic of a combustion engine for a motor vehicle in accordance with a first embodiment of the present invention is illustrated. In a preferred embodiment of the invention, the engine is a conventional combustion engine. A cooling circuit 2 is fitted to the engine 1. The cooling circuit is of a conventional type and comprises cooling channels 3, a heat exchanger 4, a coolant pump 5, and a thermostat valve 6. The cooling channels 3 are connected to cooling channels (not shown) in the engine 1. The heat exchanger 4 emits heat to the environment. The coolant pump 5 drives the coolant in the cooling circuit 2. The thermostat valve 6 opens and closes the flow of the coolant through the heat exchanger 4 and instead allows the coolant to by-pass the heat exchanger 4 in a parallel channel.

To ensure that the air flow through the heat exchanger 4 is sufficient, for example, when the vehicle drives slowly or stands still, a fan 7 connected to the heat exchanger 4 is utilized. The fan 7 can be driven in any way known to one skilled in the art, e.g., belt driven or chain driven from a power outlet coupled to the crankshaft or camshaft of the vehicle, or by means of an electric motor coupled to the fan 7.

In a preferred embodiment of the invention, the fan 7 is reversible. In this case, the fan 7 is preferably driven by an electric motor. Alternatively, a gear between driving belt or chain and the fan 7 may be utilized for mechanical driven.

Downstream from the heat exchanger 4, there is a catalytic converter at least partially coated with a catalytic material. The catalytic material is designed to convert one or more environmentally harmful substances into one or more substances which are non-harmful to the environment. Examples of environmentally harmful substances include particles, ozone, carbon monoxide, nitrous oxide, VOC, HC, NMOG, NOx, SO2 and methane.

In a preferred embodiment, the catalytic material covers cooling flanges included in the heat exchanger 4, wherein the catalytic material is given a large surface which is exposed towards the environment.

In order to detect the degree of conversion of the heat exchanger 4 or the catalytic converter, a sensor or detecting means 8, 9 are connected to control unit 10. In one embodiment of the invention, additional sensors or detecting means 9a 9m are connected to the control unit 10. These sensors or detecting means 9a 9m measure parameters related to the vehicle and the environment such as temperature, oxygen storage, flow, pressure, pressure drop, heat conduction, weight, conductivity, resistance, adhesion, fouling, chemical composition, galvanic potential, fluorescence, reflectance, absorbance. Subsequently, one or more of the parameters can be utilized when determining the concentration of the environmentally harmful substances which are converted by the catalytic material on the catalytic converter.

In another embodiment of the invention, the sensors or detecting means 9, 9a 9m are used to determine the concentration of the environmentally harmful substances which are converted by the catalytic material on the catalytic converter. This determination is based on the sensors 9a 9m measuring the substance concentration before passage through the catalytic converter.

In an alternative embodiment of the invention, the set of sensors or detecting means 9, 9a 9m comprises a pressure sensor which gives a first output signal dependent on static pressure downstream from the heat exchanger 4 and thereby on the air flow through the heat exchanger 4, wherein the control unit 10 is configured to estimate a degree of conversion based on the first output signal.

In yet another alternative embodiment of the invention, the set of detecting means or sensors 9, 9a 9m comprises a differential pressure sensor which gives a first output signal dependent on the pressure drop across the heat exchanger 4 and thereby on the air flow through the heat exchanger, wherein the control unit 10 is configured to estimate a degree of conversion based on the first output signal.

In a further alternative embodiment of the invention, the set of detecting means or sensors 9a 9m comprises a flow sensor which gives a first output signal dependent on the air flow through the heat exchanger 4, wherein the control unit 10 is configured to estimate a degree of conversion based on the first output signal.

The control unit 10 is of a type known in the art and therefore will not be described in any greater detail. In one embodiment of the invention, the control unit 10 is a microprocessor included in the engine control system. In another embodiment, the control unit 10 is a separate processor which is able to communicate with other processors in the vehicle via a bus.

In a first embodiment of the invention, the sensors or detecting means 8, 9 comprises a first temperature sensor configured to measure the temperature of the exhaust. Since the catalytic material has to reach a predetermined temperature before conversion can take place, an initial approximation of the degree of conversion of the catalytic converter with the catalytic coating can be performed by measuring to determine if an ignition or predetermined temperature of the catalytic material has been reached.

In one embodiment of the invention, the detection does not start until the engine temperature is stabilized, for example, once the engine temperature reaches 90° C. Thereafter, the thermostat valve is opened completely, and the effect of the catalytic converter is measured. The response contains the measurement of the cooling effect of the catalytic converter without any influence from the thermostat valve.

Furthermore, the efficiency of the catalytic converter and thereby the degree of conversion can be estimated in an initial approximation by means of a simple surveillance of the temperature of the exhaust. When the temperature rises too much, this indicates that the capacity of the catalytic converter has been reduced, and thereby also the degree of conversion has been reduced.

In a second embodiment of the invention, the detecting means 8, 9 further comprises a first and a second temperature sensor. In a further preferred embodiment, the first and second temperature sensors 8, 9 are mounted in the cooling circuit 2 with intermediate cooling channels in the heat exchanger 4. The control unit 10 is configured to estimate the heat emission of the heat exchanger 4 from the difference between estimated temperatures of the first temperature sensor and of the second temperature sensor. Similarly, the first and second temperature sensors 8, 9 are mounted in the exhaust system. The control unit 10 is configured to estimate the heat emission of the catalytic converter from the difference between estimated temperatures of the first temperature sensor and of the second temperature sensor By measuring the temperature at two separate positions of the heat exchanger with intermediate cooling channels, it is possible to estimate the status of the heat exchanger and thereby to estimate the degree of conversion of the catalytic coating within the area. In case the heat exchanger has cooling channels which are blocked, e.g., as a result of channels being partially or entirely filled with air or being blocked in another way, or in case cooling channels have fallen off which is not uncommon in older vehicles, the efficiency of the radiator will be reduced. This means that the reduction of the coolant temperature during the passage through the radiator will become smaller. Since no conversion will take place in those areas where channels have been blocked and the ignition temperature consequently is not reached, or in areas which have fallen off, the degree of conversion can be estimated from information on the coolant temperature reduction during the passage through the heat exchanger.

Similarly, measuring the temperature at two separate positions of the catalytic converter, it is possible to estimate the status of the catalytic converter and thereby to estimate the degree of conversion of the catalytic coating within the area. In case the catalytic converter has a blockage the efficiency of the catalytic converter will be reduced. This means that the amount of exhaust passing through the catalytic converter will become smaller. Since no conversion will take place in those areas where the converter is blocked the ignition temperature consequently is not reached, the degree of conversion can be estimated from information based on the temperature reduction during the passage through the catalytic converter.

In a preferred embodiment of the invention, the first temperature sensor 8 is placed upstream from the heat exchanger 4 and the second temperature sensor 9 is placed downstream. In one embodiment of the invention, the first temperature sensor includes a thermostat valve 6 in the cooling circuit, configured to open a passage via the heat exchanger when the coolant has reached its working temperature. Similarly, the first temperature sensor 8 can be placed upstream from the catalytic converter and the second temperature sensor is placed downstream.

In an alternative embodiment of the invention, the temperature sensors 8, 9 are placed directly inside the heat exchanger material, in direct connection with flanges included in the heat exchanger 4. In an alternate embodiment, the temperature sensors 8, 9 are placed in the catalytic converter.

Figure 2:
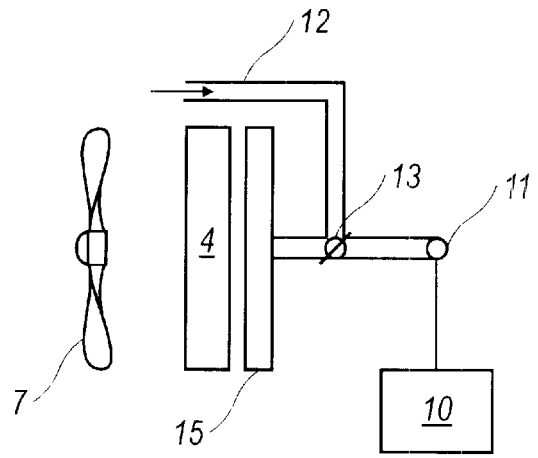
FIG. 2 is a schematic illustration of a combustion engine according to a second embodiment of the invention.

Referring to FIG. 2, a schematic of a combustion engine in accordance with a second embodiment of the present invention is illustrated. As illustrated, the detecting means comprises a first sensor 11 connected to the heat exchanger 4. The first sensor 11 is of the type known for detecting environmentally harmful substances, such as found in the ozone. In order to estimate the degree of conversion of the catalytic coating, a value measured for treated air has to be compared with a value for untreated air. In one embodiment of the invention, this value can be normative, e.g., a value stored in the control unit 10. In another embodiment of the invention, the comparison is based on a sensor which is subjected to treated air and a sensor which is subjected to untreated air. In a preferred embodiment of the invention, only a first sensor is utilized, wherein two alternative air routes are provided for reaching the sensor, partly a route with passage via the heat exchanger 4, and partly a route where passage does not take place. In order to accomplish this, in one embodiment the motor vehicle is provided with an air channel 12 that has a channel that is partly arranged to direct air to the detecting means without passing the heat exchanger 4, and partly is arranged to direct air to the detecting means via passage through the heat exchanger 4. An air valve 13, enabling passage from the selected inlet, is arranged in the air channel. Subsequently, a comparison of the output signal from these two measurement points can be utilized in order to estimate the degree of conversion of the catalytic coating on the heat exchanger 4.

Similarly, the first sensor 11 is connected to the catalytic converter thus comparisons can be made between air treated by the catalytic converter with air that was not treated.

Figure 3:
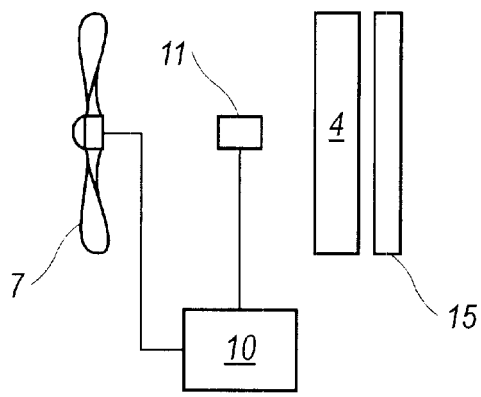
FIG. 3 is a schematic illustration of a combustion engine according to a third embodiment of the invention.

Referring to FIG. 3, a schematic of a combustion engine in accordance with a third embodiment of the present invention is illustrated. As illustrated, instead of the air channel 12, the direction of rotation of the fan 7 can be varied. In this case, a sensor 11 is used to measure the content of environmentally harmful substances in air that passes through the heat exchanger 4, and in air that has not passed through the heat exchanger 4. Accordingly, the sensor can be mounted upstream or downstream from the radiator, as viewed from the normal traveling direction of the vehicle, wherein a first measurement is performed with the fan operating in the normal direction and a second with the fan operating in reversed direction. In order to reverse the fan, the fan is preferably controlled by an electric motor. In alternate embodiments, the fan is conventionally driven, e.g., belt or chain driven if a gear is arranged between the drive shaft from the engine and the fan.

Similarly, the fan 7 can be used with the catalytic converter where the first sensor measures the content of environmentally harmful substances in air that passes through the catalytic converter and in air that has not passed through the catalytic converter.

In yet a further embodiment of the invention, the air inlet of the combustion engine is used instead of a fan to collect in part air flow that has passed through the radiator, and in part that which has not passed through the radiator. In this case, two air channels are fitted to the air inlet of the combustion engine, having its inlet downstream the radiator, and one having its inlet from an unaffected region. A sensor is mounted in the channel system driven by the air inlet of the combustion engine.

Similarly, the air inlet is used to collect air that passed through the catalytic converter and air that did not pass through the catalytic converter.

Since sensors as a rule are sensitive to the environment, the sensor is preferably mounted in a protected location, for example behind the radiator or catalytic converter. In a preferred embodiment of the invention, the sensor is an ozone sensor.

In a further embodiment of the invention, the vehicle comprises a generator or means for generating the environmentally harmful substances, wherein the means are arranged to subject the heat exchanger to a predetermined concentration upstream from the heat exchanger 4 when determining the degree of conversion of the environmentally harmful substances, where as the detecting means is configured to measure the concentration of the environmentally harmful substances downstream from the heat exchanger.

Similarly, the generator or means for generating the environmentally harmful substances, wherein the means are arranged to subject the catalytic converter to a predetermined concentration when determining the degree of conversion of the environmentally harmful substances, where as the detecting means is configured to measure the concentration of the environmentally harmful substances downstream from the catalytic converter.

In those embodiments where only one sensor or detecting means is utilized, preferably a predetermined level of the environmentally harmful substances is produced by the generating means. In case where sensors are placed both upstream and downstream from the heat exchanger 4 or catalytic converter, preferably the concentration of the environmentally harmful substances is measured partly before passage through the heat exchanger 4 or catalytic converter, and partly after passage through the heat exchanger 4 or catalytic converter, with the determination of the degree of conversion taking place by means of comparing the measured values upstream and downstream from the heat exchanger 4 or catalytic converter.

In a preferred embodiment, the means for generating a environmentally harmful substances is an ozone generator, in which ozone is generated for example by means of discharges or by UV-light.

Figure 4:
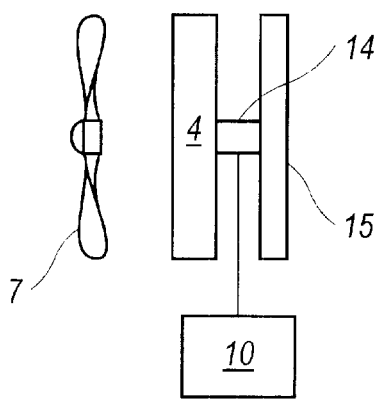
FIG. 4 is a schematic illustration of a combustion engine according to a fourth embodiment of the invention.

Referring to FIG. 4, a schematic of a combustion engine is accordance with a fourth embodiment of the present invention is illustrated. As illustrated, a set of detecting means or sensors 9, 9a–9n comprises a test cell 14, coated with a catalytic coating, which is mounted on the heat exchanger or catalytic converter or in a position which is equally exposed to the influence from the environment. Equally exposed means that a test cell placed in the equivalent position upon an average is degraded at the same rate as, or at a rate which exhibits a linear relationship to, a cell placed on the heat exchanger 4 or catalytic converter.

Accordingly, in one embodiment of the invention, the detecting means comprise a test cell coated with a catalytic coating exhibiting electrical or optical properties which change with wear and/or fouling, and where the control unit is arranged to estimate the degree of conversion of the heat exchanging member 4 or catalytic converter with the catalytic coating from an output signal generated by the test cell.

In a preferred embodiment of the invention, the optical properties of the test cell change with loss of the catalytic material. This is accomplished by applying the catalytic material onto a transparent carrier and placing a light detector in connection with the test cell. When losing catalytic material, the transparency increases which enables detection of the degree of conversion. The transparent carrier preferably comprises a plastic having an adhesiveness to catalytic material which is similar to aluminum.

In one embodiment of the invention utilizing such a test cell, the electrical properties of the catalytic coating located on the test cell change with wear and/or fouling.

In a second embodiment of the invention utilizing such a test cell, the test cell carries an additional conductive layer on top of the catalytic coating, wherein the electrical properties of the additional conductive layer change with wear and/or fouling.

In a third embodiment of the invention utilizing such a test cell, the test cell carries an additional conductive layer on top of the catalytic coating, wherein the electrical properties of the additional conductive layer change with wear and/or fouling.

In a fourth embodiment of the invention utilizing such a test cell, the test cell carries one or more wires, the electrical properties of which change with wear and/or fouling, wherein the wires are designed to change in relation to the degradation of the catalytic coating. In a preferred embodiment of the fourth embodiment utilizing the test cell, the wires are designed in a way sensitive to corrosion and insulated so that the insulation falls off at the same rate as the catalytic coating degrades, wherein the wires corrode and their electrical properties change or the circuit is opened. In a further preferred embodiment, the wires are sensitive to corrosion and insulated so that the insulation falls off at the same rate as the catalytic coating degrades wherein the wires corrode and their electrical properties change or the circuit is opened.

Furthermore, the test cell is provided with means for heating the wires, wherein degradation of the catalytic material and thereby the degree of conversion is estimated by heating the wires with a current pulse alter which the cooling course is studied by determining the thermal conductivity of the surface and thereby the correlating degradation of the catalytic coating.

As mentioned above, the test cell is mounted on the heat exchanger 4 or in an equally exposed position, alternatively is a portion of the surface of the heat exchanger 4.

In the case when a change of the optical properties of the test cell is utilized, according to one embodiment, the test cell comprises a photocell mounted beneath a transparent carrier coated with a catalytic coating, wherein the test cell is arranged to generate an output signal dependent on the optical absorbance or reflectance of the test cell and thereby correlating with the degradation of the catalytic coating. Furthermore, according to a further embodiment, the test cell can comprise a second photocell mounted beneath a second transparent carrier without any catalytic coating, wherein the test cell is arranged to generate a second output signal dependent on the difference in absorbance or reflectance between the two transparent carriers, and wherein the second output signal is utilized in order to determine the degradation of the catalytic coating.

In order to ensure that the measurement of reflectance and absorbance takes place with a well-defined light intensity, in one embodiment of the invention, the detecting means includes a light source illuminating the test cell when determining absorbance or reflectance, wherein a light intensity which is well-defined for the determination of absorbance or reflectance is obtained.

In a further embodiment of the invention utilizing a test cell, the optical properties of which change with degradation of the catalytic material, the detecting means comprise a photocell mounted in such a way that it is bit by light emitted via fluorescence or phosphorescence from the catalytic coating, wherein a first output signal is created dependent on the optical absorbance or reflectance of the test cell and thereby correlating with the degradation of the catalytic coating. In order to ensure that emitted light remains within a controlled range, the test cell is provided with a light source illuminating the test cell with light which results in light being emitted from the test cell which is measured by the photocell.

In a preferred embodiment, the detecting means comprise a second photocell which is mounted in such a way that it is hit by light emitted from a surface which is not coated with fluorescent material, wherein a second output signal is generated and utilized as a reference for the first output signal from the surface which is coated with a catalytic coating having fluorescence, wherein the ratio or difference between the first and second photocell is utilized in order to determine the degradation of the catalytic coating.

In order to ensure that the test cell estimates maximum deviation from optimum degree of conversion, the test cell preferably is mounted in an exposed position, for example directly behind the fan.

The invention is not limited to the above-described embodiments, but may be varied within the scope of the following claims.

What is claimed is:

1. A motor vehicle having an engine, a cooling circuit connected to the engine provided with a heat exchanger, a catalytic converter located downstream from said heat exchanger, wherein the catalytic converter is arranged to be heated by an air flow passing through the catalytic converter, wherein the catalytic converter is at least partially coated with catalytic material for conversion of environmentally harmful substances in ambient air, wherein the motor vehicle further comprises:
   a control unit; and
   a detecting means connected to said control unit, said detecting means connected to said control unit for determining a degree of conversion of one or more environmentally harmful substances by the catalytic coating of the catalytic converter,
   wherein said control unit is configured to measure the concentration of said one or more environmentally harmful substances before or after conversion of the one or more environmentally harmful substances into substances which are not harmful to the environment.

2. The motor vehicle according to claim 1 wherein said detecting means is configured to measure the concentration of the one or more environmentally harmful substances and determines a d degree of conversion of the one or more environmentally harmful substances.

3. The motor vehicle according to claim 1 wherein said detecting means comprises a first temperature sensor configured to provide a first output signal dependent on the temperature of coolant in the cooling circuit and said control unit is configured to determine a degree of conversion based on said first output signal.

4. The motor vehicle according to claim 3, further comprising a second temperature sensor connected to said cooling circuit, and said first and second temperature sensors are mounted in the cooling circuit with intermediate cooling channels in the heat exchanger, wherein said control unit determines heat emission of the heat exchanger based on differences between determined temperature of the first temperature sensor and of the second temperature sensor.

5. The motor vehicle according to claim 4 wherein said control unit is configured to estimate the degree of conversion based on the difference between estimated temperature of the first temperature sensor and of the second temperature sensor.

6. The motor vehicle according to claim 4 wherein said first temperature sensor and the second temperature sensor are placed upstream and downstream from the heat exchanger.

7. The motor vehicle according to claim 4 wherein said first temperature sensor comprises a thermostat valve in the cooling circuit, with said thermostat valve being configured to open and close the flow of the cooling circuit through the heat exchanger.

8. The motor vehicle according to claim 4 wherein said second temperature sensor is mounted on the heat exchanger in connection with cooling flanges included in the heat exchanger.

9. The motor vehicle according to claim 1 wherein said detecting means comprise a first sensor configured to measure the content of the environmentally harmful substances downstream from the heat exchanging member.

10. The motor vehicle according to claim 9 wherein said motor vehicle further comprises means for deflecting the air flow passing said heat exchanger, wherein said first sensor is configured to be exposed partly to a first air flow which has passed the heat exchanger wherein a third output signal is generated, and partly to a second air flow which has not passed the heat exchanger wherein a fourth output signal is generated, at which said control unit is configured to estimate the degree of conversion based on said third and fourth output signals.

11. The motor vehicle according to claim 10 wherein said deflecting means comprises an air channel which directs air to by-pass the heat exchanger.

12. The motor vehicle according to claim 10 wherein said deflecting means comprises a means for reversing a fan, said fan being coupled with the heat exchanger, wherein said reversing means allows said first sensor to be exposed partly to a first air flow which has passed the heat exchanger, and partly to a second air flow which has not passed the heat exchanger.

13. The motor vehicle according to claim 9 wherein said detecting means comprise a second sensor which is arranged to measure the content of the environmentally harmful substances upstream the heat exchanger and wherein said control unit is configured to estimate the degree of conversion based on output signals from said first and second sensors.

14. The motor vehicle according to claim 13 wherein said engine is a combustion engine having an air inlet, said second sensor being located in an air channel connected to said air inlet via a valve in a way possible to close said valve.

15. The motor vehicle according to claim 9, further comprising means for generating a predetermined concentration of the environmentally harmful substances, wherein said means are arranged to expose the heat exchanger to a predetermined concentration upstream the heat exchanger when determining the degree of conversion of the environmentally harmful substances, where after said detecting means is configured to measure the concentration of the environmentally harmful substances downstream from the heat exchanger.

16. The motor vehicle according to claim 1 wherein said detecting means comprises a pressure sensor providing a first output signal dependent on static pressure downstream from the heat exchanger and thereby on the air flow through the heat exchanger, wherein said control unit is configured to determine a degree of conversion based on said first output signal.

17. The motor vehicle according to claim 1 wherein said detecting means comprises a differential pressure sensor providing a first output signal dependent on the pressure drop across the heat exchanger and thereby on the air flow through the heat exchanger, wherein said control unit is configured to determine a degree of conversion based on said first output signal.

18. The motor vehicle according to claim 1 wherein said detecting means comprises a flow sensor providing a first output signal dependent on the air flow through the heat exchanger, wherein said control unit is configured to estimate a degree of conversion based on said first output signal.

19. The motor vehicle according to claim 1 wherein said detecting means comprises a test cell coated with a catalytic coating exhibiting electrical or optical properties which change with wear and/or fouling and wherein said control unit is configured to estimate the degree of conversion of the heat exchanger with the catalytic coating from an output signal generated by said test cell.

20. The motor vehicle according to claim 19 wherein said test cell comprises one or more wires having electrical properties changing in relation to the degradation of the catalytic coating.

21. The motor vehicle according to claim 20 wherein said one or more wires are sensitive to corrosion and insulated, and insulation falls off the wire at the same rate as the catalytic coating degrades, wherein the wires corrode and their electrical properties change or the circuit is opened.

22. The motor vehicle according to claim 20 wherein said test cell comprises means for heating the wires, wherein degradation of the catalytic material and the degree of conversion is determined by means of heating the wires with a current pulse after which the cooling course is determined based on the thermal conductivity of a surface, thereby providing the correlating degradation of the catalytic coating.

23. The motor vehicle according to claim 19 wherein said test cell comprises a photocell mounted beneath a transparent carrier coated with a catalytic coating, wherein said test cell is arranged to generate an output signal dependent on optical absorbance or reflectance of the test cell and thereby correlating with the degradation of the catalytic coating.

24. The motor vehicle according to claim 23 wherein said test cell comprises a second photocell mounted beneath a second transparent carrier without catalytic coating, wherein said test cell is arranged to generate a second output signal dependent on the difference in absorbance or reflectance between the two transparent carriers, wherein said second output signal is utilized in order to determine the degradation of the catalytic coating.

25. The motor vehicle according to claim 23 wherein said detecting means comprise a light source illuminating the test cell when determining absorbance or reflectance, wherein a light intensity which is well-defined for the determination of absorbance or reflectance is obtained.

26. The motor vehicle according to claim 19 wherein said detecting means comprise a photocell mounted in such a way that it is bit by light emitted via fluorescence or phosphorescence from the catalytic coating, wherein a first output signal is created dependent on the optical absorbance or reflectance of the test cell and thereby correlating with the degradation of the catalytic coating.

27. The motor vehicle according to claim 26 wherein said detecting means comprises a light source illuminating the test cell, wherein emitted light from the catalytic coating is generated.

28. The motor vehicle according to claim 26 wherein said detecting means comprises a second photocell which is mounted in such a way that said second photocell receives light emitted from a surface which is not coated with fluorescent material, wherein a second output signal is generated which is utilized as a reference for the first output signal from the surface which is coated with a catalytic coating having fluorescence, wherein the difference between light received in the first and second photocell is utilized in order to determine the degradation of the catalytic coating.

29. A motor vehicle having an engine, a cooling circuit connected to the engine provided with a heat exchanger, a catalytic converter located downstream from said heat exchanger, wherein the catalytic converter is arranged to be heated by an air flow passing through the catalytic converter, wherein the catalytic converter is at least partially coated with catalytic material for conversion of environmentally harmful substances in ambient air, wherein the motor vehicle further comprises:
    a control unit; and
    a detecting means connected to said control unit, said detecting means connected to said control unit for determining a degree of conversion of one or more environmentally harmful substances by the catalytic coating of the catalytic converter,
    wherein said detecting means is configured to measure the concentration of the one or more environmentally harmful substances and determines a degree of conversion of the one or more environmentally harmful substances.

30. A motor vehicle having an engine, a cooling circuit connected to the engine provided with a heat exchanger, a catalytic converter located downstream from said heat exchanger, wherein the catalytic converter is arranged to be heated by an air flow passing through the catalytic converter, wherein the catalytic converter is at least partially coated with catalytic material for conversion of environmentally harmful substances in ambient air, wherein the motor vehicle further comprises:

a control unit; and a detecting means connected to said control unit, said detecting means connected to said control unit for determining a degree of conversion of one or more environmentally harmful substances by the catalytic coating of the catalytic converter, wherein said detecting means comprises a first temperature sensor configured to provide a first output signal dependent on the temperature of coolant in the cooling circuit and said control unit is configured to determine a degree of conversion based on said first output signal.

31. The motor vehicle according to claim 30, further comprising a second temperature sensor connected to said cooling circuit, and said first and second temperature sensors are mounted in the cooling circuit with intermediate cooling channels in the heat exchanger, wherein said control unit determines heat emission of the heat exchanger based on differences between determined temperature of the first temperature sensor and of the second temperature sensor.

32. The motor vehicle according to claim 31 wherein said control unit is configured to estimate the degree of conversion based on the difference between estimated temperature of the first temperature sensor and of the second temperature sensor.

33. The motor vehicle according to claim 31 wherein said first temperature sensor and the second temperature sensor are placed upstream and downstream from the heat exchanger.

34. The motor vehicle according to claim 31 wherein said first temperature sensor comprises a thermostat valve in the cooling circuit, with said thermostat valve being configured to open and close the flow of the cooling circuit through the heat exchanger.

35. The motor vehicle according to claim 31 wherein said second temperature sensor is mounted on the heat exchanger in connection with cooling flanges included in the heat exchanger.

36. A motor vehicle having an engine, a cooling circuit connected to the engine provided with a heat exchanger, a catalytic converter located downstream from said heat exchanger, wherein the catalytic converter is arranged to be heated by an air flow passing through the catalytic converter, wherein the catalytic converter is at least partially coated with catalytic material for conversion of environmentally harmful substances in ambient air, wherein the motor vehicle further comprises:

a control unit; and a detecting means connected to said control unit, said detecting means connected to said control unit for determining a degree of conversion of one or more environmentally harmful substances by the catalytic coating of the catalytic converter, wherein said detecting means comprises a first sensor configured to measure the content of the environmentally harmful substances downstream from the heat exchanging member.

37. The motor vehicle according to claim 36 wherein said motor vehicle further comprises means for deflecting the air flow passing said heat exchanger, wherein said first sensor is configured to be exposed partly to a first air flow which has passed the heat exchanger wherein a third output signal is generated, and partly to a second air flow which has not passed the heat exchanger wherein a fourth output signal is generated, at which said control unit is configured to estimate the degree of conversion based on said third and fourth output signals.

38. The motor vehicle according to claim 37 wherein said deflecting means comprises an air channel which directs air to by-pass the heat exchanger.

39. The motor vehicle according to claim 37 wherein said deflecting means comprises a means for reversing a fan, said fan being coupled with the heat exchanger, wherein said reversing means allows said first sensor to be exposed partly to a first air flow which has passed the heat exchanger, and partly to a second air flow which has not passed the heat exchanger.

40. The motor vehicle according to claim 36 wherein said detecting means comprise a second sensor which is arranged to measure the content of the environmentally harmful substances upstream the heat exchanger and wherein said control unit is configured to estimate the degree of conversion based on output signals from said first and second sensors.

41. The motor vehicle according to claim 40 wherein said engine is a combustion engine having an air inlet, said second sensor being located in an air channel connected to said air inlet via a valve in a way possible to close said valve.

42. The motor vehicle according to claim 36, further comprising means for generating a predetermined concentration of the environmentally harmful substances, wherein said means are arranged to expose the heat exchanger to a predetermined concentration upstream the heat exchanger when determining the degree of conversion of the environmentally harmful substances, where after said detecting means is configured to measure the concentration of the environmentally harmful substances downstream from the heat exchanger.

43. A motor vehicle having an engine, a cooling circuit connected to the engine provided with a heat exchanger, a catalytic converter located downstream from said heat exchanger, wherein the catalytic converter is arranged to be heated by an air flow passing through the catalytic converter, wherein the catalytic converter is at least partially coated with catalytic material for conversion of environmentally harmful substances in ambient air, wherein the motor vehicle further comprises:

a control unit; and a detecting means connected to said control unit, said detecting means connected to said control unit for determining a degree of conversion of one or more environmentally harmful substances by the catalytic coating of the catalytic converter, wherein said detecting means comprises a pressure sensor providing a first output signal dependent on static pressure downstream from the heat exchanger and thereby on the air flow through the heat exchanger, wherein said control unit is configured to determine a degree of conversion based on said first output signal.

44. A motor vehicle having an engine, a cooling circuit connected to the engine provided with a heat exchanger, a catalytic converter located downstream from said heat exchanger, wherein the catalytic converter is arranged to be heated by an air flow passing through the catalytic converter, wherein the catalytic converter is at least partially coated with catalytic material for conversion of environmentally harmful substances in ambient air, wherein the motor vehicle further comprises:

a control unit; and a detecting means connected to said control unit, said detecting means connected to said control unit for determining a degree of conversion of one or more environmentally harmful substances by the catalytic coating of the catalytic converter, wherein said detecting means comprises a differential pressure sensor providing a first output signal dependent on the pressure drop across the heat exchanger and thereby on the air flow through the heat exchanger, wherein said control unit is configured to determine a degree of conversion based on said first output signal.

45. A motor vehicle having an engine, a cooling circuit connected to the engine provided with a heat exchanger, a catalytic converter located downstream from said heat exchanger, wherein the catalytic converter is arranged to be heated by an air flow passing through the catalytic converter, wherein the catalytic converter is at least partially coated with catalytic material for conversion of environmentally harmful substances in ambient air, wherein the motor vehicle further comprises:

a control unit; and a detecting means connected to said control unit, said detecting means connected to said control unit for determining a degree of conversion of one or more environmentally harmful substances by the catalytic coating of the catalytic converter, wherein said detecting means comprises a flow sensor providing a first output signal dependent on the air flow through the heat exchanger, wherein said control unit is configured to estimate a degree of conversion based on said first output signal.

46. A motor vehicle having an engine, a cooling circuit connected to the engine provided with a heat exchanger, a catalytic converter located downstream from said heat exchanger, wherein the catalytic converter is arranged to be heated by an air flow passing through the catalytic converter, wherein the catalytic converter is at least partially coated with catalytic material for conversion of environmentally harmful substances in ambient air, wherein the motor vehicle further comprises:

a control unit; and a detecting means connected to said control unit, said detecting means connected to said control unit for determining a degree of conversion of one or more environmentally harmful substances by the catalytic coating of the catalytic converter, wherein said detecting means comprises a test cell coated with a catalytic coating exhibiting electrical or optical properties which change with wear and/or fouling and wherein said control unit is configured to estimate the degree of conversion of the heat exchanger with the catalytic coating from an output signal generated by said test cell.

47. The motor vehicle according to claim 46 wherein said test cell comprises one or more wires having electrical properties changing in relation to the degradation of the catalytic coating.

48. The motor vehicle according to claim 47 wherein said one or more wires are sensitive to corrosion and insulated, and insulation falls off the wire at the same rate as the catalytic coating degrades, wherein the wires corrode and their electrical properties change or the circuit is opened.

49. The motor vehicle according to claim 47 wherein said test cell comprises means for heating the wires, wherein degradation of the catalytic material and the degree of conversion is determined by means of heating the wires with a current pulse after which the cooling course is determined based on the thermal conductivity of a surface, thereby providing the correlating degradation of the catalytic coating.

50. The motor vehicle according to claim 46 wherein said test cell comprises a photocell mounted beneath a transparent carrier coated with a catalytic coating, wherein said test cell is arranged to generate an output signal dependent on optical absorbance or reflectance of the test cell and thereby correlating with the degradation of the catalytic coating.

51. The motor vehicle according to claim 50 wherein said test cell comprises a second photocell mounted beneath a second transparent carrier without catalytic coating, wherein said test cell is arranged to generate a second output signal dependent on the difference in absorbance or reflectance between the two transparent carriers, wherein said second output signal is utilized in order to determine the degradation of the catalytic coating.

52. The motor vehicle according to claim 50 wherein said detecting means comprise a light source illuminating the test cell when determining absorbance or reflectance, wherein a light intensity which is well-defined for the determination of absorbance or reflectance is obtained.

53. The motor vehicle according to claim 46 wherein said detecting means comprises a photocell mounted in such a way that it is bit by light emitted via fluorescence or phosphorescence from the catalytic coating, wherein a first output signal is created dependent on the optical absorbance or reflectance of the test cell and thereby correlating with the degradation of the catalytic coating.

54. The motor vehicle according to claim 53 wherein said detecting means comprises a light source illuminating the test cell, wherein emitted light from the catalytic coating is generated.

55. The motor vehicle according to claim 53 wherein said detecting means comprises a second photocell which is mounted in such a way that said second photocell receives light emitted from a surface which is not coated with fluorescent material, wherein a second output signal is generated which is utilized as a reference for the first output signal from the surface which is coated with a catalytic coating having fluorescence, wherein the difference between light received in the first and second photocell is utilized in order to determine the degradation of the catalytic coating.

* * * * *